US009725583B2

(12) United States Patent
Wu et al.

(10) Patent No.: US 9,725,583 B2
(45) Date of Patent: Aug. 8, 2017

(54) METHOD FOR PREPARING CELLULOSE NANOFIBER CAPABLE OF BEING STABLY DISPERSED

(71) Applicant: Technical Institute of Physics and Chemistry of the Chinese Academy of Sciences, Beijing (CN)

(72) Inventors: Min Wu, Beijing (CN); Yong Huang, Beijing (CN); Shigenori Kuga, Beijing (CN); Pei Huang, Beijing (CN)

(73) Assignee: Technical Institute of Physics and Chemistry of the Chinese Academy of Sciences, Beijing (CN)

( * ) Notice: Subject to any disclaimer, the term of this patent is extended or adjusted under 35 U.S.C. 154(b) by 74 days.

(21) Appl. No.: 14/361,861

(22) PCT Filed: Nov. 6, 2012

(86) PCT No.: PCT/CN2012/084128
§ 371 (c)(1),
(2) Date: May 30, 2014

(87) PCT Pub. No.: WO2013/078936
PCT Pub. Date: Jun. 6, 2013

(65) Prior Publication Data
US 2014/0299019 A1    Oct. 9, 2014

(30) Foreign Application Priority Data

Nov. 30, 2011  (CN) .......................... 2011 1 0391262

(51) Int. Cl.
*C08L 1/12* (2006.01)
*D01F 2/28* (2006.01)
(Continued)

(52) U.S. Cl.
CPC ......... *C08L 1/12* (2013.01); *C08B 3/00* (2013.01); *C08B 3/20* (2013.01); *C08B 16/00* (2013.01);
(Continued)

(58) Field of Classification Search
None
See application file for complete search history.

(56) References Cited

U.S. PATENT DOCUMENTS

| 8,287,692 | B2 | 10/2012 | Miyawaki et al. |
| 8,377,563 | B2 | 2/2013 | Miyawaki et al. |
| 2010/0282422 | A1* | 11/2010 | Miyawaki et al. ............. 162/76 |

FOREIGN PATENT DOCUMENTS

| CN | 102430390 A | 5/2012 |
| JP | 2009293167 A | 12/2009 |

OTHER PUBLICATIONS

Gurgel et al., 2008, "Adsorption of Cu(II), Cd(II), and Pb(II) from Aqueous Single Metal Solutions by Cellulose and Mercerized Cellulose Chemically Modified with Succinic Anhydride," Bioresource Technology, 99:3077-3083.
(Continued)

*Primary Examiner* — Jacob Thomas Minskey
(74) *Attorney, Agent, or Firm* — Eversheds Sutherland (US) LLP

(57) ABSTRACT

A method for preparing stably dispersed cellulose nanofibers comprises the following steps: 1) mixing cellulose and an organic solvent, the percentage of the cellulose being 1% to 15% in weight; 2) adding an esterification agent into the resultant mixture of step 1), the molar ratio of the esterification agent to the cellulose being from 1:0.1 to 4; and 3) physically breaking the resultant mixture of step 2) until a suspension liquid with stably dispersed cellulose nanofibers of 2-1000 nm in diameter and 10-100 μm in length is obtained, an esterification reaction of hydroxyl group(s) on the surface of cellulose fibers occurring at the time of the
(Continued)

breaking. Also disclosed are dispersed cellulose nanofibers with improved compatibility to the matrix than the untreated cellulose and an improved strength of the composite materials.

6 Claims, 2 Drawing Sheets

(51) Int. Cl.
*C08B 3/00* (2006.01)
*C08B 3/20* (2006.01)
*C08B 16/00* (2006.01)
*C08L 1/10* (2006.01)

(52) U.S. Cl.
CPC .................. *C08L 1/10* (2013.01); *D01F 2/28* (2013.01); *C08L 2201/56* (2013.01); *C08L 2205/16* (2013.01)

(56) References Cited

OTHER PUBLICATIONS

Cai, 2007, "Modifications of Cellulose and Their Applications to Pulp and Paper," World Pulp and Paper, 26(4):18-22.
PCT International Search Report for PCT Application No. PCT/CN2012/084128 mailed Feb. 28, 2013 (6 pages).

\* cited by examiner

METHOD FOR PREPARING CELLULOSE NANOFIBER CAPABLE OF BEING STABLY DISPERSED

CROSS REFERENCE TO RELATED APPLICATIONS

This application claims the priority benefit of PCT/CN2012/084128 filed on Nov. 6, 2012 and Chinese Application No. 201110391262.1 filed on Nov. 30, 2011. The contents of these applications are hereby incorporated by reference in their entirety.

FIELD OF THE INVENTION

The present invention relates to field of nanomaterial preparation, especially to a method for high efficiency and mass production of natural plants (comprising herbaceous plants and woody plants) nanofibers, which can be stably dispersed in various organic solvents.

BACKGROUND OF THE INVENTION

The cellulose comprises natural cellulose (with crystal structure of cellulose I) and regenerated cellulose (with crystal structure of cellulose II). The cellulose forms fine fiber structure by crystallization to a certain extent. The diameters of the fine fibers are various as the species of cellulose materials (wood, cotton, hemp, rayon and so on), usually in a range from several nanometers to tens of nanometers. The cellulose fibers in such sizes are usually called as cellulose nanofibers. However, in normal cellulose based materials, the nanofiber units are bound firmly because of the strong hydrogen bonding interactions among them, the preparation of the cellulose nanofibers is very difficult and special processes are needed.

Cellulose nanofibers have very high mechanical strength and large specific surface area. Composite materials with excellent properties may be obtained by adding the cellulose nanofibers into synthetic resins. Therefore, a lot of people have tried to prepare nanofibers from natural cellulose. Current solutions comprise:

1. Method of High Pressure Homogenizing

Adding water to cellulose and breaking it by a pulverizer until a suspension liquid is obtained. The fine particles are obtained from the suspension liquid by a high pressure homogenizer, in which the liquid is erupted from slim tubes under high pressure and hits onto the solid wall. The cellulose microfibers prepared by this method has been commercial available by Daicel Corporation. However, since there are problems such as long processing time, low production efficiency, insufficient dispersion, nano-scale particles may not be obtained in the method of the high pressure homogenizer.

2. Method of Rotary Breaking

Machines used in this method are the ones precisely manufactured based on the refiners and beaters used in papermaking industries for breaking the pulp fibers into microfibers. The production efficiency of this method is high but the dispersion degree is not sufficient.

3. Method of Introducing Surface Charges

Cellulose is dispersed into water and is oxidized by TEMPO. The surface of the cellulose fibers is charged negatively by introducing carboxylic acid groups. The nanofibers are dispersed by electrostatic repulsion among the charges. This is disclosed by Isogai et al., see H. Fukuzumi, T. Saito, T. Iwata, Y. Kumamoto, A. Isogai, *Biomacromolecules* 2008, vol. 10, pp 162-165. The nanofibers thus obtained are applicable in field of packaging film. The problem of the method is that the procedures of oxidation and dispersion should be controlled accurately.

4. Method of Ball Milling

Cellulose and dispersant solvent are added into a ball mill pot with hard balls made of metal or ceramic. The cellulose is dissociated through the impact force of the hard balls from rotation and vibration of the ball mill pot. The dispersant solvent is normally water and may also be organic solvent. The problem of the method is that the dispersing efficiency is relatively low and it takes long time to dissociate cellulose to nanofibers. Furthermore, it was also proposed to recombine cellulose and synthetic resins by mix during ball milling, see T. Endo, R. Kitagawa, F. Zhang, T. Hirotsu, J. Hosokawa, *Chemistry Letters*, 1999, vol. 11, pp. 1155-1156. However, the size of fibers obtained by the mixing is in large scale not in nanometers.

In the above mentioned methods, it is easier to obtain the nano-scale fibers by the method of introducing surface charges. Since water is used as the dispersant in almost all the above methods, surfaces of the fibers thus prepared are bounded with hydroxyl groups, while carboxyl groups in the method of introducing surface charge, the fibers are hydrophilic. When adding the hydrophilic fibers to the synthesis resins, since the compatibility and contact therebetween are too bad to mix sufficiently, the reinforcement of the cellulose to the resins is not strong and water resistance of the prepared composite is weak.

SUMMARY OF THE INVENTION

The present invention is to provide a method for preparing cellulose nanofibers. By step of simultaneously mechanically breaking and surface modifying, i.e. an esterification reaction is occurred at the same time when the cellulose is being mechanically disintegrated, the nanofibers may be prepared in high efficiency and in big batch. The cellulose processed in the method keeps the fine fiber structure, while the cellulose is esterified and disintegrated by introducing ester group(s) into the contacting interfaces of the adjacent fine fibers.

According to one aspect of the invention, there provides a method for preparing cellulose nanofibers, comprising steps of,
1) mixing cellulose with an organic solvent, the percentage of the cellulose is 1%-15% in weight;
2) adding an esterification agent into the resultant mixture of step 1), the molar ratio of the esterification agent to the cellulose is 1:0.1 to 4;
3) physically breaking the resultant mixture of step 2), until a suspension liquid with stably dispersed cellulose nanofibers of 2-1000 nm in diameter and 100-100 μm in length is obtained, an esterification reaction of hydroxyl group(s) on the surface of cellulose fibers is occurring at the meantime of the breaking;
4) washing the resultant suspension liquid of step 3) by centrifugation to obtain a suspension liquid with cellulose nanofibers dispersed in the organic solvent.

A flow-birefringent phenomenon is observed in the obtained cellulose nanofibers suspension through crossed polarizers.

In case that the above steps are repeated without any esterification agent added, the resultant cellulose will precipitate quickly because of insufficient dispersion.

Preferably, the cellulose is natural plant cellulose.

Preferably, the natural plant cellulose is natural herbaceous cellulose or natural wood cellulose.

Preferably, the cellulose is one or more regenerated cellulose from natural herbaceous plants or natural woody plants.

Preferably, the organic solvent is an organic solvent having no hydroxyl group.

Preferably, the organic solvent having no hydroxyl group is selected from acetone, methanamide, ethanamide, N,N-dimethylformamide, N,N-dimethylacetamide, phenylamine, tetrahydrofuran, diethyl ether, benzene, methylbenzene, dimethylbenzene, chlorobenzene, hexane, dimethyl sulfoxide, dioxane, ethyl acetate, ethanoic acid, ethanenitrile, pyridine, methacrylic acid or trichloromethane. The above organic solvents are non-aqueous solvents, specially are aprotic polar solutions, used as a dispersant solvent.

Preferably, the esterification agent comprises acyl chlorides (such as acetyl chloride, butyryl chloride, hexanoyl chloride, lauroyl chloride) or acid anhydrides (such as acetic anhydride, succinic anhydride, maleic anhydride). The water content in the esterification agent should be as low as possible to increase the esterifying efficiency. The reaction system belongs to heterogeneous esterification reactions of cellulose, and the esterification only occur on the hydroxyl groups on the surface of cellulose.

Preferably, the physical breaking is implemented by a ball mill, a disc mill, a high pressure homogenizer, a sonicator or a mortar grinder.

The present invention has the following beneficial effects:

Since the surface of the cellulose nanofibers with the esterified surface is hydrophobized by alkyl molecular chains, the dispersant solvent may be DMF, or may be replaced by other solvents, cellulose nanofibers may be stably dispersed in the organic solvent. As the procedure of the method is simple and the yield is high, the mass production of cellulose nanofibers may be expected. Moreover, when recombining the cellulose nanofibers of the invention with the synthetic resins, compatibility of the cellulose to the matrix is better than that of the untreated cellulose, and thus the strength of the composite material may be improved.

DESCRIPTION OF THE DRAWINGS

The present invention will be further explained with reference to the drawings.

DETAILED DESCRIPTION OF THE INVENTION

Example 1

Figure 1:
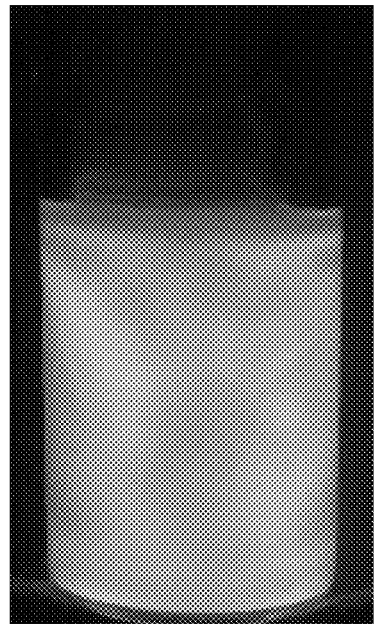
FIG. 1 shows a flow-birefringent organic suspension of product of example 1 viewed through crossed polarizers.
Figure 2:
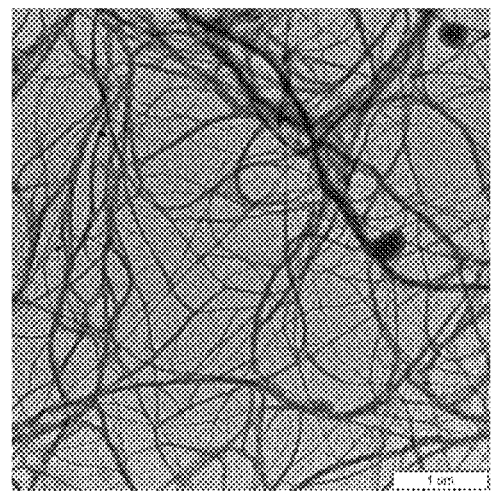
FIG. 2 shows a TEM image of example 1.
Figure 3:
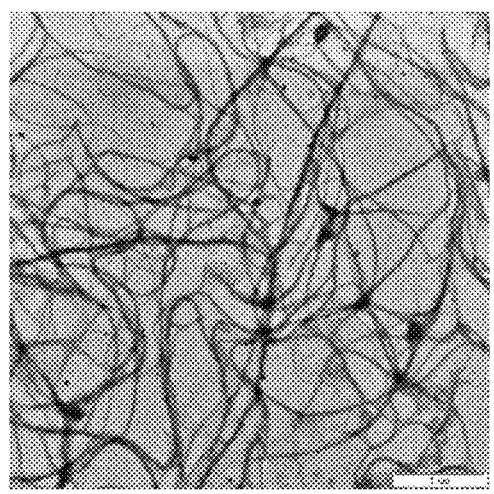
FIG. 3 shows a TEM image of drying and re-dispersion of example 1.

A method for preparing stably dispersed cellulose nanofibers, comprising following steps:
1) mixing natural wood cellulose with N,N-dimethylformamide, the percentage of the cellulose is 1% in weight;
2) adding acetyl chloride into the resultant mixture of step 1), the molar ratio of acetyl chloride to cellulose is 1:0.1;
3) physically breaking the resultant mixture of step 2) by a disc mill until a suspension liquid with stably dispersed cellulose nanofibers of 2-1000 nm in diameter and 10-100 μm in length is obtained, an esterification reaction of hydroxyl group(s) on the surface of cellulose fibers is occurring at the meantime of the disc milling;
4) washing the resultant suspension liquid of step 3) by centrifugation to obtain a suspension liquid with cellulose nanofibers dispersed in N,N-dimethylformamide.

A flow-birefringent phenomenon is observed in the obtained cellulose nanofibers suspension through crossed polarizers.

In a comparative example to Example 1, the above steps are repeated without any esterification agent added, the resultant cellulose will precipitate quickly because of insufficient dispersion.

Example 2

A method for preparing stably dispersed cellulose nanofibers, comprising following steps:
1) mixing natural wood cellulose with N,N-dimethylacetamide, the percentage of the cellulose is 7% in weight;
2) adding acetic anhydride into the resultant mixture of step 1), the molar ratio of acetic anhydride to cellulose is 1:1;
3) physically breaking the resultant mixture of step 2) by a ball mill until a suspension liquid with stably dispersed cellulose nanofibers of 2-1000 nm in diameter and 10-100 μm in length is obtained, an esterification reaction of hydroxyl group(s) on the surface of cellulose fibers is occurring at the meantime of the ball milling;
4) washing the resultant suspension liquid of step 3) by centrifugation to obtain a suspension liquid with cellulose nanofibers dispersed in N,N-dimethylacetamide.

A flow-birefringent phenomenon is observed in the obtained cellulose nanofibers suspension through crossed polarizers.

In a comparative example to Example 2, the above steps are repeated without any esterification agent added, the resultant cellulose will precipitate quickly because of insufficient dispersion.

Example 3

A method for preparing stably dispersed cellulose nanofibers, comprising the following steps:
1) mixing natural herbaceous cellulose with tetrahydrofuran, the percentage of the cellulose is 10% in weight;
2) adding butyryl chloride into the resultant mixture of step 1), the molar ratio of butyryl chloride to cellulose is 1:2;
3) physically breaking the resultant mixture of step 2) by a high pressure homogenizer until a suspension liquid with stably dispersed cellulose nanofibers of 2-1000 nm in diameter and 10-100 μm in length is obtained, an esterification reaction of hydroxyl group(s) on the surface of cellulose fibers is occurring at the meantime of the physically breaking;
4) washing the resultant suspension liquid of step 3) by centrifugation to obtain a suspension liquid with cellulose nanofibers dispersed in tetrahydrofuran.

A flow-birefringent phenomenon is observed in the obtained cellulose nanofibers suspension through crossed polarizers.

In a comparative example to Example 3, the above steps are repeated without any esterification agent added, the resultant cellulose will precipitate quickly because of insufficient dispersion.

Example 4

A method for preparing stably dispersed cellulose nanofibers, comprising the following steps:
1) mixing natural wood cellulose with trichloromethane, the percentage of the cellulose is 13% in weight;
2) adding succinic anhydride into the resultant mixture of step 1), and the molar ratio of succinic anhydride to cellulose is 1:3;
3) physically breaking the resultant mixture of step 2) by a sonicator until a suspension liquid with stably dispersed cellulose nanofibers of 2-1000 nm in diameter and 10-100 μm in length is obtained, an esterification reaction of hydroxyl group(s) on the surface of cellulose fibers is occurring at the meantime of the physical breaking;
4) washing the resultant suspension liquid of step 3) by centrifugation to obtain a suspension liquid with cellulose nanofibers dispersed in trichloromethane.

A flow-birefringent phenomenon is observed in the obtained cellulose nanofibers suspension through crossed polarizers.

In a comparative example to Example 4, the above steps are repeated without any esterification agent added, the resultant cellulose will precipitate quickly because of insufficient dispersion.

Example 5

A method for preparing stably dispersed cellulose nanofibers, comprising the following steps:
1) mixing natural herbaceous cellulose with methanamide, the percentage of the cellulose is 15% in weight;
2) adding hexanoyl chloride into the resultant mixture of step 1), the molar ratio of hexanoyl chloride to cellulose is 1:4;
3) physically breaking the resultant mixture of step 2) with a mortar grinder until a suspension liquid with stably dispersed cellulose nanofibers of 2-1000 nm in diameter and 10-100 μm in length is obtained, an esterification reaction of hydroxyl group(s) on the surface of cellulose fibers is occurring at the meantime of the physical breaking;
4) washing the resultant suspension liquid of step 3) by centrifugation to obtain a suspension liquid with cellulose nanofibers dispersed in methanamide.

A flow-birefringent phenomenon is observed in the obtained cellulose nanofibers suspension through crossed polarizers.

In a comparative example to Example 5, the above steps are repeated without any esterification agent added, the resultant cellulose will precipitate quickly because of insufficient dispersion.

Example 6

Example 1 is repeated. Differences from Example 1 are that the organic solvent is dimethyl sulfoxide and the esterification agent is lauroyl chloride.

Example 7

Example 2 is repeated. Differences from Example 2 are that the organic solvent is dioxane and the esterification agent is maleic anhydride.

Example 8

Example 3 is repeated. Differences from Example 3 are that the organic solvent is ethyl acetate and the esterification agent is acetyl chloride.

Example 9

Example 4 is repeated. Differences from Example 4 are that the organic solvent is ethanoic acid and the esterification agent is acetyl chloride.

Example 10

Example 5 is repeated. Differences from Example 5 are that the organic solvent is acetone and the esterification agent is acetyl chloride.

Example 11

Example 1 is repeated. Differences from Example 1 are that the organic solvent is ethanenitrile and the esterification agent is butyryl chloride.

Example 12

Example 2 is repeated. Differences from Example 2 are that the organic solvent is pyridine and the esterification agent is lauroyl chloride.

Example 13

Example 3 is repeated. Differences from Example 3 are that the organic solvent is methacrylic acid and the esterification agent is maleic anhydride.

Example 14

Example 1 is repeated. Differences from Example 1 are that the organic solvent is ethanamide and the esterification agent is butyryl chloride.

Example 15

Example 2 is repeated. Differences from Example 2 are that: the organic solvent is diethyl ether and the esterification agent is lauroyl chloride.

Example 16

Example 3 is repeated. Differences from Example 3 are that the organic solvent is benzene and the esterification agent is maleic anhydride.

Example 17

Example 1 is repeated. Differences from Example 1 are that the organic solvent is methylbenzene and the esterification agent is acetic anhydride.

Example 18

Example 2 is repeated. Difference from Example 2 is that the organic solvent is dimethylbenzene.

Example 19

Example 3 is repeated. Difference from Example 3 is that the organic solvent is chlorobenzene.

Example 20

Example 1 is repeated. Difference from Example 1 is that the organic solvent is hexane.

Example 21

Example 2 is repeated. Differences from Example 2 is that the organic solvent is phenylamine.

It is apparently that the above examples of the present invention are only for illustration of the present invention without any limitation to the embodiments of the present invention. Various modifications or variations can be made for a skilled person in the art based on the above description. It is impossible to list all the embodiments here. Any obvious modification or variation derived from the embodiments of the present invention is still within the scope of the present invention.

We claim:

1. A method for preparing stably dispersed cellulose nanofibers, comprising the following steps:
   1) mixing a cellulose with an organic solvent, the percentage of the cellulose being 1%-15% in weight;
   2) adding an esterification agent into the resultant mixture of step 1), wherein the molar ratio of the esterification agent to the cellulose is 1:0.1 to 4; and
   3) physically breaking the resultant mixture of step 2) until a suspension liquid with stably dispersed cellulose nanofibers of 2-1000 nm in diameter and 10-100 μm in length is obtained, wherein an esterification reaction of hydroxyl group(s) on the surface of cellulose fibers occurs during the breaking step, wherein the organic solvent contains no hydroxyl group,
   wherein the organic solvent is selected from the group consisting of acetone, methanamide, ethanamide, N,N-dimethylformamide, N,N-dimethylacetamide, phenylamine, tetrahydrofuran, diethyl ether, benzene, methylbenzene, dimethylbenzene, chlorobenzene, hexane, dimethyl sulfoxide, dioxane, ethyl acetate, ethanoic acid, ethanenitrile, pyridine, methacrylic acid, and trichloromethane, and
   wherein the esterification agent is selected from the group consisting of acetyl chloride, butyryl chloride, hexanoyl chloride, and lauroyl chloride.

2. The method of claim 1, further comprising a step of washing the resultant suspension liquid of step 3) by centrifugation to obtain a suspension liquid with cellulose nanofibers dispersed in the organic solvent.

3. The method of claim 1, wherein the cellulose is a natural plant cellulose.

4. The method of claim 3, wherein the natural plant cellulose is natural herbaceous cellulose or natural wood cellulose.

5. The method of claim 3, wherein the natural plant cellulose is one or more regenerated cellulose from natural herbaceous plants or natural woody plants.

6. The method of claim 1, wherein the physical breaking is implemented by a ball mill, a disc mill, a high pressure homogenizer, a sonicator or a mortar grinder.

* * * * *